United States Patent [19]

Westermann et al.

[11] Patent Number: 6,058,555
[45] Date of Patent: May 9, 2000

[54] WIPER BLADE WITH WIND-DEFLECTING SURFACE FOR WINDSHIELD WIPER SYSTEMS OF MOTOR VEHICLES

[75] Inventors: Klaus-Juergen Westermann, Karlsbad, Germany; Hubert Verelst, Tienen, Belgium; Ann Schoeters, Korbeek-Dijle, Belgium; Jan Vanroy, Schaffen, Belgium

[73] Assignee: Robert Bosch GmbH, Stuttgart, Germany

[21] Appl. No.: 09/029,266

[22] PCT Filed: May 10, 1997

[86] PCT No.: PCT/DE97/00946

§ 371 Date: Feb. 25, 1998

§ 102(e) Date: Feb. 25, 1998

[87] PCT Pub. No.: WO98/01325

PCT Pub. Date: Jan. 15, 1998

[30] Foreign Application Priority Data

Jul. 5, 1996 [DE] Germany ................... 196 27 113

[51] Int. Cl.[7] ........................................... B60S 1/38
[52] U.S. Cl. ................................................ 15/250.201
[58] Field of Search ................... 15/250.201, 250.44, 15/250.351, 250.32, 250.361

[56] References Cited

U.S. PATENT DOCUMENTS

| 4,590,638 | 5/1986 | Beneteau | 15/250.201 |
|---|---|---|---|
| 5,086,534 | 2/1992 | Journee | 15/250.201 |
| 5,093,954 | 3/1992 | Kuzuno | 15/250.201 |
| 5,168,596 | 12/1992 | Maubray | 15/250.201 |

FOREIGN PATENT DOCUMENTS

| 459302 | 12/1991 | European Pat. Off. | 15/250.201 |
|---|---|---|---|
| 0 398 376 B1 | 8/1994 | European Pat. Off. | |
| 287464 | 10/1988 | France | 15/250.201 |
| GM 78 26 802 | 2/1980 | Germany | |
| 4017078 | 11/1991 | Germany | 15/250.201 |
| 6-234353 | 8/1994 | Japan | 15/250.201 |
| 2272831 | 6/1994 | United Kingdom | 15/250.201 |

*Primary Examiner*—Gary K. Graham
*Attorney, Agent, or Firm*—Michael J. Striker

[57] ABSTRACT

A wiper blade is proposed, which is used to clean windows of motor vehicles. The wiper blade has load bearing frame for a wiper strip placed against the window and displaceable over the window crosswise to the longitudinal extent thereof, and a wind deflector strip disposed on the load bearing frame and extending approximately parallel to the wiper strip, which wind deflector strip has a wind baffle facing into the relative wind, one longitudinal edge of which is located nearer the window than its other longitudinal edge located behind the first longitudinal edge in terms of the approach direction of the relative wind. Universal use of the wiper blade is obtained if the wind deflector strip can be mounted suspended from the load bearing frame or standing upright on the load bearing frame, and in each of the two mounting positions has a wind baffle oriented toward the relative wind.

7 Claims, 3 Drawing Sheets

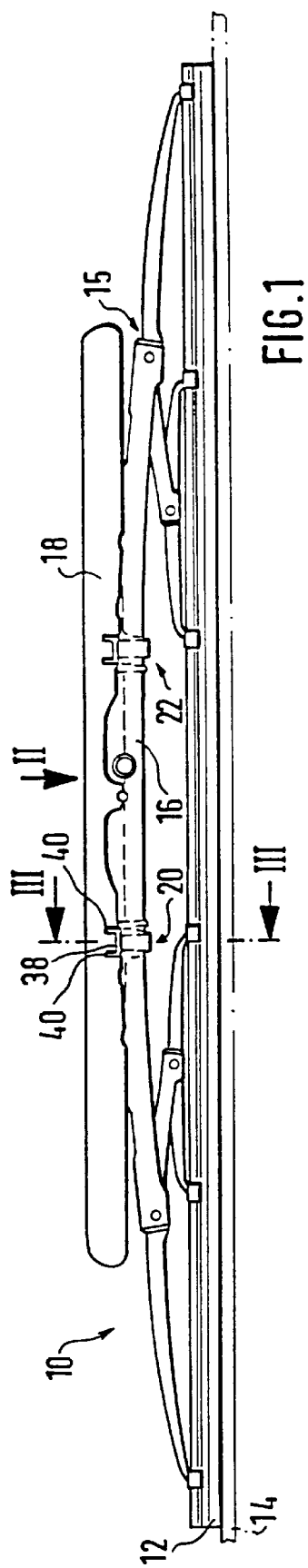
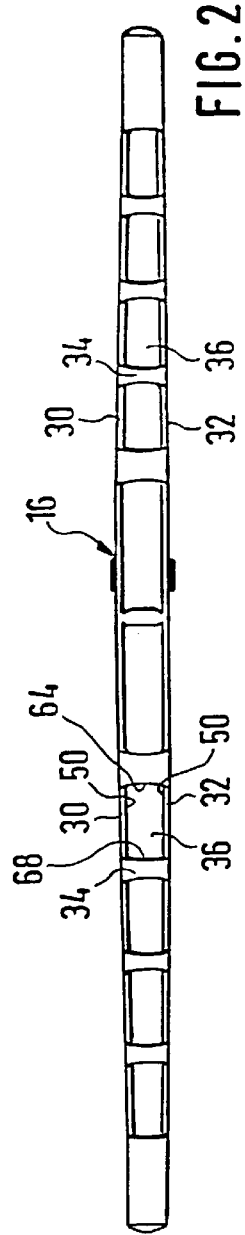
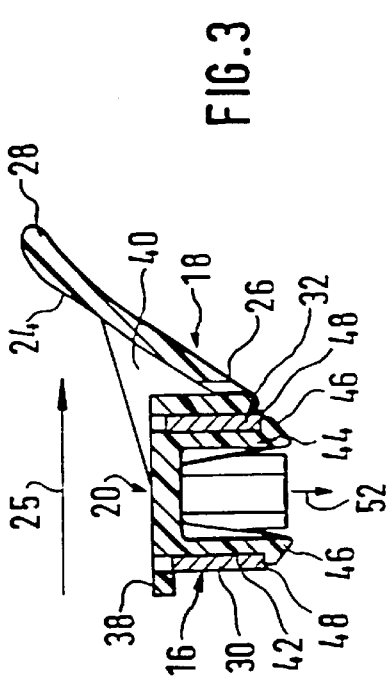

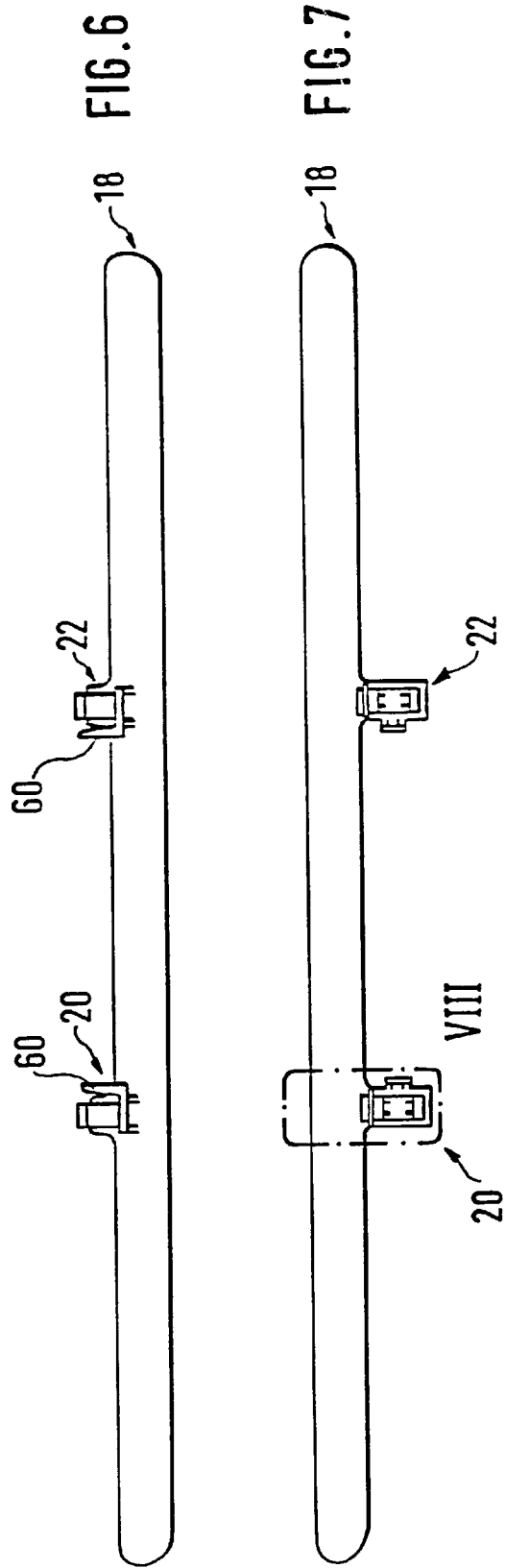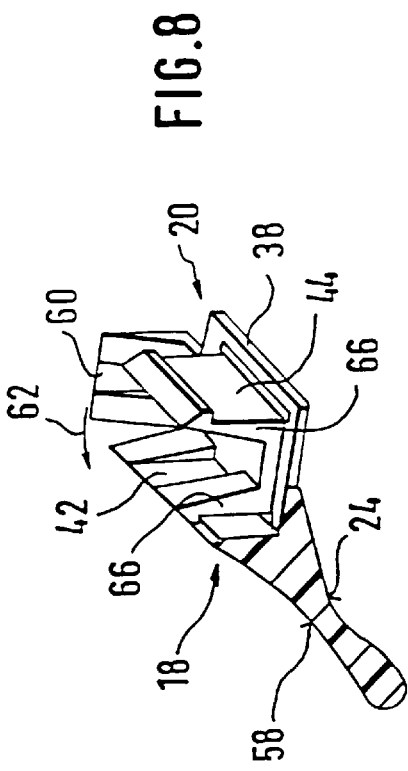

WIPER BLADE WITH WIND-DEFLECTING SURFACE FOR WINDSHIELD WIPER SYSTEMS OF MOTOR VEHICLES

BACKGROUND OF THE INVENTION

The present invention relates to a wiper blade for motor vehicle windshield wiper systems.

In systems for wiping especially the windshield of motor vehicles, certain difficulties arise at high travel speeds, because then the contact pressure of the wiper blade against the window is reduced, with increasing travel speed, by the relative wind striking the wiper blade, and as a result the wiping quality, at least in certain regions of the window, no longer meets the demands made of it. At lower travel speeds, on the other hand, an increased contact pressure would lead to undesirably high and disadvantageous friction between the wiper strip of the wiper blade and the window.

In a known wiper system (European Patent Disclosure EP 0 398 376 B1), a wind deflector strip has been screwed to the wiper blade, extending downward toward the window from the load bearing frame—that is, disposed in suspended fashion; this wind deflector strip, with a wind baffle oriented toward the relative wind, covers substantial portions of the wiper blade. The relative wind striking the oblique wind baffle and/or the negative pressure that builds up behind the wind deflector strip in the region of the wiper blade, are intended especially at high travel speeds to increase the contact pressure of the wiper blade against the window. However, such a suspended disposition of the wind deflector strip, in certain cases—for instance given a special pivotable connection of the wiper blade to a drive wiper arm or where there are relatively short radii of curvature in spherically curved windows—can be problematic. Difficulties can also arise if the wiper system is provided with a device that relieves the wiper blade, in its parking position, from the contact pressure that is required during operation. In such cases, an upright disposition of the wind deflector strip can prove expedient.

In a known wiper system (German Utility Model G 78 26 802.7), the wind deflector strip is mounted on the top of the wiper arm that guides the wiper blade.

SUMMARY OF THE INVENTION

In the inventive wiper blade in keeping with these objects, one feature of present invention resides, briefly stated, in a wiper blade, in which the wind deflector strip is mountable suspended from the load bearing frame or standing upright on the load bearing frame and in each of the two mounting positions has a wind baffle oriented toward the relative wind. However, the wind deflector strip—in adaptation to particular given conditions—must be desired either in suspended or upright fashion on the load bearing frame of the wiper blade. For both mounting possibilities of the wind deflector strip, there is one wind baffle each oriented toward the relative wind, one longitudinal edge of which is located closer to the window than the other wind baffle longitudinal edge, which because of the necessary oblique position is behind the first longitudinal edge in terms of the approach direction of the relative wind.

This makes for simplifications and economies in A production of the wiper blade, as well as easier stockkeeping.

It is especially advantageous if the same fastening device can be used for both mounting positions. Simple mounting of the wind deflector strip to the load bearing frame, which can even be done by the final user, is obtained if furthermore the fastening device has detent means on the wind deflector strip, with which counterpart detent means and of the load bearing frame are associated, because thus no special tools are needed to mount it on the load bearing frame, and moreover the expenditure of time for the mounting is very slight.

If the wiper blade, whose load bearing frame has a metal bracket of U-shaped cross section extending in the direction of the wiper strip, it is provided in a further feature of the invention that the counterpart detent means are embodied on the legs of the U of the load bearing bracket, and the base of the U that joins the two legs of the U is removed, in at least a portion of the load bearing bracket, in order to form an opening, so that a stable detent connection between the wind deflector strip and the load bearing frame is attained.

In a wind deflector strip made from an elastic plastic, it is proved to be expedient if at least two elastically deflectable detent hooks acting as detent means are disposed on the wind deflector strip, spaced apart from one another in its longitudinal direction, and one opening in the base of the U of the load bearing bracket is associated with each of them.

In a further feature of the invention, the openings are defined by the opposed inner cheeks of the legs of the U, and the resultant leg edges toward the base of the U serve as counterpart detent means for two spring tabs, disposed in pairs, that from the free ends of the legs of the U engage between the legs of the U of the load bearing frame and that have outward-oriented detent hooks that form the detent means. During the mounting operation, the spring tabs deflect inward, because they rest on the inner cheeks with their outward-oriented detent hooks. In this arrangement, the wind deflector strip is mounted suspended from the load bearing frame, because it extends substantially from the load bearing frame toward the window. An upright disposition of the wind deflector strip on the load bearing frame is obtained if the free leg edges of the legs of the U act as counterpart detent means for two spring tabs, disposed in pairs and with outward-oriented detent hooks that form the detent means, the tabs engaging between the legs of the U of the load bearing bracket from the base of the U. In this upright disposition of the wind deflector strip, the wind deflector strip extends upward beyond the load bearing frame.

Expediently, the spring tabs are disposed on one longitudinal edge of the wind deflector strip and are integrally joined to it.

A stable design of the detent means with exact positioning of the wind deflector strip on the load bearing frame is attained in accordance with a further feature of the invention whenever the spring tabs, on their ends remote from the detent hooks, are joined to a base plate, which is joined to the wind deflector strip and which serve stop shoulders for the leg edges opposite the leg edges that act as counterpart detent means.

If furthermore the spring tabs rest with initial tension against the facing inner cheeks of the legs of the U, the detent locking between the wind deflector strip and the load bearing frame occurs automatically upon assembly.

Simple fixation of the wind deflector strip to the load bearing frame in the longitudinal direction thereof is obtained by providing that an elastically deflectable clamping tab extending crosswise to the two spring tabs is disposed on the base plate, resting with initial tension on a long edge of the opening, and pressing the end faces of the spring tabs remote from it against the opposite long edge of the opening.

To optimize their effect, the wind baffles facing one another and oriented toward the window to be wiped, one or the other of which is oriented toward the relative wind depending on how the wind deflector strip is mounted on the load bearing frame—are provided with an at least approximately uniformly embodied profile.

Advantageous refinements of and improvements to the invention can be learned from the ensuing description of a wiper blade embodied according to the invention, which is shown in the drawing and illustrates an exemplary embodiment of the invention.

BRIEF DESCRIPTION OF THE DRAWINGS

FIG. 1, an elevation view of a wiper blade with a wind deflector strip disposed upright on its load bearing frame;

FIG. 2, a plan view on a main bracket, shown on a larger scale, belonging to a load bearing frame of the wiper blade;

FIG. 3, a section through the main bracket, of FIG. 1, on an enlarged scale and taken along the line III—III;

FIG. 6, a side view of the wind deflector strip of FIGS. 1 and 4;

FIG. 7, a plan view on the wind deflector strip of FIG. 6; and

FIG. 8, a detail marked VIII in FIG. 7 of the wind deflector strip, in a perspective view on a larger scale.

DESCRIPTION OF THE PREFERRED EMBODIMENT

Figure 5:
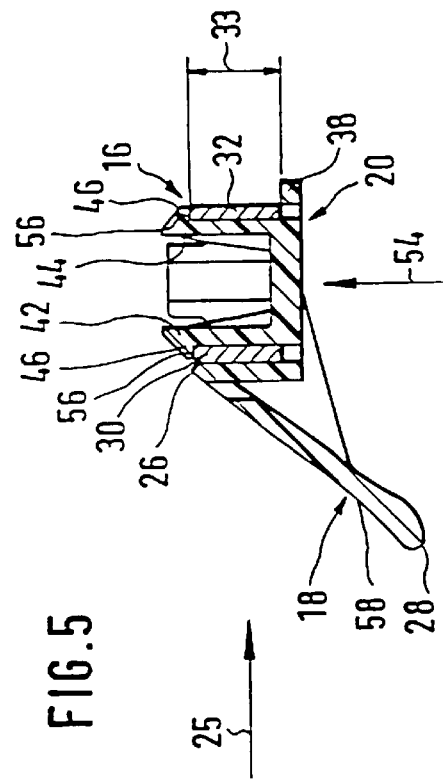
FIG. 5, a section through the main bracket of FIG. 4, taken along the line V—V, on a larger scale.

A wiper blade 10 shown in FIG. 1 rests with a wiper strip 12, made of a rubberlike material, on the surface of a window 14 shown in dot-dashed lines in FIG. 1. To clean the surface of the window, the wiper blade 10 is displaced crosswise to its longitudinal extent over the surface of the window 14 to be wiped. The wiper strip 12 is held via a framelike load bearing bracket system 15, to the main bracket 16 of which a driven wiper arm, not shown, is secured. Disposed on the main bracket 16 is a wind deflector strip 18, which like the wiper blade 10 is embodied in the elongated fashion. Securing the wind deflector strip 18 to the main bracket 16 is done via a fastening device, which in the exemplary embodiment is in two parts and is designated by reference numerals 20 and 22. Hereinafter, the fastening device 20, 22 will be explained in terms of the partial fastening device 20, which is shown in section in FIG. 3. The wind deflector strip 18 has a first wind baffle 24, which is oriented toward the relative wind represented by the arrow 25. The wind baffle 24 is inclined against the relative wind in such a way that its lower longitudinal edge 26 is located closer to the window 14 to be wiped than its other longitudinal edge 28, which in terms of the approach direction (arrow 25) of the relative wind is behind the first longitudinal edge 26. As FIG. 3 also shows, the wind baffle 24 of the wind deflector strip 18 extends upward past the main bracket 16, so that in this arrangement, it can be said that the wind deflector strip 18 is disposed upright on the main bracket 26. This criterion is also clearly visible in FIG. 1. For securing the wind deflector strip 18 to the metal main bracket 16, of U-shaped cross section, this bracket has openings 36 at the base 34 of the U that joins together the two legs 30 and 32 of the U. The fastening device 20 is formed integrally onto the wind deflector strip 18, which is made of a plastic. It has a base plate 38, which is rigidly joined to the actual wind deflector strip via struts 40. Disposed on the base plate 38 are two spring tabs 42 and 44, which extend downward from it through the opening 36 and, with detent hooks 46 facing outward and disposed on their free ends, engage the free end edges 48 of the legs 30, 32 of the U. The openings 36 are defined by the inner cheeks 50, facing one another, of the legs 30, 32 of the U, so that spring tabs 42, 44 can rest on the inner cheeks 50. The spring tabs 42, 44 are disposed such that on being inserted through the inner cheeks 50 of the legs 30, 32 of the U, they are deflected toward one another, thereby resting with their detent hooks 46 on the inner cheeks 50. Once the spring tabs 42, 44 have been inserted through the opening in the direction of the arrow 52 in FIG. 3, the spring tabs 42, 44 deflect into their operating position shown in FIG. 3 and lock together with the end edges 48 of the legs 30, 32 of the U. Accordingly with their detent hooks, the spring tab form detent means, which cooperate to make a detent connection with the end edges 48, acting as counterpart detent means, of the legs 32, 34 of the U. The base plate 38 also performs the task of stop shoulders, on which the first end edges of the legs 30, 32 of the U rest, while the other end edges thereof are engaged from behind by the detent hooks 46 of the spring tabs 42, 44. Accordingly the spacings from the base plate 38 to the detent hooks 46 should be adapted to the heightwise dimensions 33 of the legs 30, 32 of the U (FIG. 5). Another special feature of the fastening device 20 will be explained hereinafter in conjunction with FIG. 8.

Figure 4:
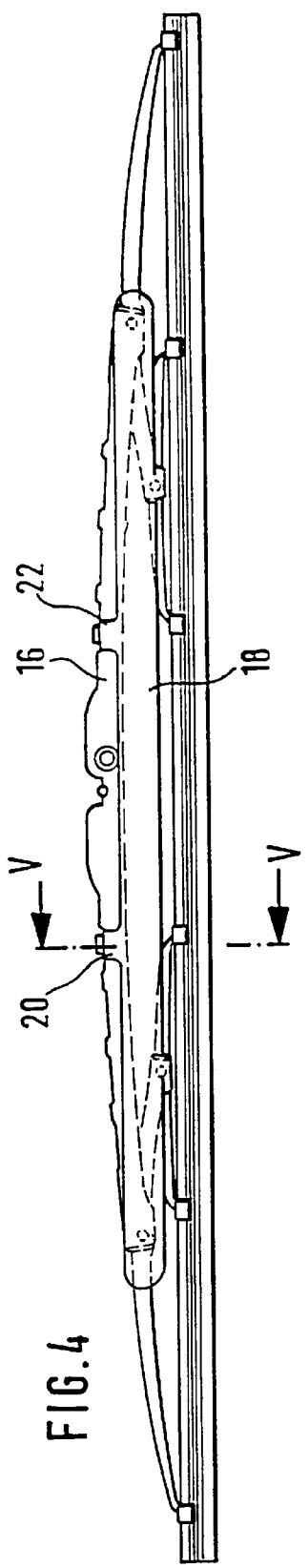
FIG. 4, an elevation view of a wiper blade with a wind deflector strip disposed suspended from its load bearing frame.

FIGS. 4 and 5 show the wiper blade 10, whose fundamental design is equivalent to the design already described in conjunction with FIG. 1. In a departure from this, however, the wind deflector strip 18 is disposed in suspended fashion from the main bracket 16. A suspended disposition should be understood to mean that the wind deflector strip 18 extends downward from the main bracket 16 toward the window 14. For mounting the wind deflector strip 18 on the main bracket 16, the wind deflector strip is introduced from below, in the direction of the arrow 54, with the spring tabs 42, 44 between the legs 32, 34 of the main bracket 16, until the fastening device 20 with its base plate 38 comes to rest on the free ends of the legs 32, 34 of the U. In this position, the spring tabs 42, 44, which during assembly have been deflected toward one another, yield into their mounting position shown in FIG. 5, in which with their detent hooks 46 they engage the leg edges toward the base of the U from behind. These leg edges are due to the fact that the base 34 of the U of the main bracket 16 is provided with the openings 36, which are extended as far as the inner cheeks 50 facing one another (FIG. 2) of the main bracket. The leg edges 56 toward the base of the U thus form counterpart detent means, which serve with the spring tabs 42, 44 acting as detent means and provided with the detent hooks 46.

The suspended disposition of the wind deflector strip 18 on the main bracket 16 of the load bearing frame 14 as in FIG. 5 differs from the upright disposition of FIG. 3 thus only in that the same wind deflector strip can be locked to the main bracket 16 either in the direction of the arrow 52 (FIG. 3) or in the direction of the arrow 54 (FIG. 5), without having to make special provisions for the purpose on the load bearing frame or the wind deflector strip. In the suspended disposition of the wind deflector strip 18 shown in FIG. 5, a different wind baffle 58 faces toward the relative wind (arrow 25). The two wind baffles 24 and 58 of the wind deflector strip 18 are located on the surfaces remote from one another of the wind deflector strip 18, and each has an at least approximately uniformly embodied profile.

FIG. 8 especially clearly shows a further feature of the invention, in which a clamping tab 60 extending crosswise to the two paired spring tabs 42, 44, is disposed on the base plate 38 of the fastening device 20. As the fastening device 20 is being introduced into the opening 36, associated with it, of the main bracket 16, with elastic deflection in the direction of the arrow 62, the clamping tab 60 is supported on the one long edge 64 or 68 of the opening 36. Since the two partial fastening devices 20, 22, spaced apart from one another in the longitudinal direction of the wind deflector strip 18, are anchored in the same way in the openings 36, associated with them, of the main bracket 16 and since the clamping tabs 60 act in opposite directions (FIG. 6), the result is an operationally reliable, firm connection and an absolutely play-free seat of the fastening devices 20 and 22 in the openings 36, associated with them, of the wind deflector strip 18 on the main bracket 16 of the load bearing bracket frame 15. For the sake of easier comprehension, the disposition and design of the clamping tabs 60 have been explained only in conjunction with FIG. 8.

From the described exemplary embodiment, it is thus clear that in a wiper blade as defined by the preamble to claim 1, the wind deflector strip 18 can be mounted either suspended from the load bearing frame 15 or standing upright on the load bearing frame 14, and that the wind deflector strip has one wind baffle 24 or 58, as applicable, facing into the relative wind (arrow 25), in each of the two mounting positions.

We claim:

1. A wiper blade (10) for windshield wiper systems of motor vehicles, said blade having a load bearing frame (15) supporting on enlongated wiper strip (12) to be placed against a window of said vehicle and displaceable over the window (14) crosswise to the longitudinal extent thereof, and a wind deflector strip (18) disposed on the load bearing frame and extending approximately parallel to the wiper strip, which wind deflector strip has a wind baffle (24, 58) facing into a relative wind, one longitudinal edge of which is located nearer the window than its other longitudinal edge located behind the first longitudinal edge in terms of the approach direction of the relative wind, the wind deflector strip (18) being mountable in at least one of two positions selected from the group consisting of a mounting position in which the wind deflector strip is suspended from the load bearing frame (15) and a mounting position in which it is standing upright on the load bearing frame (15), and in each of the two mounting positions having the wind baffle (24, 58) oriented toward the relative wind (arrow 25), a fastening device (20) having detent means (42–46) on the wind deflector strip (18) with which counter part detent means (48, 56) of the load bearing frame (15) are associated, the load bearing frame (15) having a bracket (16) of U-shaped transverse cross-section extending in a direction of the wiper strip, the counter part detent means being embodied on legs (30, 32) of the U of the load bearing bracket (16), and a base (34) of the U that joins the two legs of the U being removed, in at least a portion of the load bearing bracket in order to form an opening (36), two pair of elastically deflectable spring tabs (42,44) having outwardly oriented detent hooks (46) thereon acting as the detent means are disposed on the wind deflector strip (18) spaced apart from one another in its longitudinal direction, and one opening (36) in the base (34) of the U of the load bearing bracket (16) being provided for each of them, the openings (36) being defined by inner cheeks (50), facing one another, of the legs (30, 32) of the U, and the resultant leg edges acting as the counterpart detent means for said two pair of spring tabs (42, 44), the tabs engaging between the legs of the U of the load bearing frame and extending past said edges.

2. The wiper blade of claim 1, wherein the fastening device (20, 22) is usable for both mounting positions.

3. The wiper blade of claim 1, wherein the spring tabs (42, 44) are disposed adjacent one longitudinal edge (26) of the wind buffle and are integrally joined to it.

4. The wiper blade of claim 3, wherein the spring tabs (42, 44), on their ends remote from the detent hooks (46), are joined to a base plate (38), which is part of the wind deflector strip (18) and which serves as stop shoulders for the leg edges opposite the leg edges that act as the counterpart detent means.

5. The wiper blade of claim 4 wherein the spring tabs (42, 44) rest with initial tension against the facing inner cheeks (50) of the legs of the U.

6. The wiper blade of one of claim 4, wherein on each base plate (38) an elastically deflectable clamping tab (60) is disposed, extending crosswise to the two spring tabs (42, 44), and that the clamping tabs rest with mutual initial tension against one longitudinal edge (64, 68) of the opening (36).

7. The wiper blade of one of claim 1, wherein the two facing wind baffles (24,58), oriented toward the window (14) to be wiped, have a profile embodied as at least approximately uniform.

* * * * *